US 8,298,984 B2

(12) United States Patent
Lee et al.

(10) Patent No.: US 8,298,984 B2
(45) Date of Patent: Oct. 30, 2012

(54) NON-PYROPHORIC CATALYST FOR WATER-GAS SHIFT REACTION AND METHOD OF PREPARING THE SAME

(75) Inventors: Hyun-chul Lee, Hwaseong-si (KR);
Doo-hwan Lee, Suwon-si (KR);
Kang-hee Lee, Yongin-si (KR);
Eun-duck Park, Suwon-si (KR);
Yun-ha Kim, Jeju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/119,700

(22) Filed: May 13, 2008

(65) Prior Publication Data
US 2009/0170695 A1   Jul. 2, 2009

(30) Foreign Application Priority Data
Dec. 28, 2007   (KR) .................. 10-2007-0140671

(51) Int. Cl.
*B01J 23/10*   (2006.01)
*B01J 23/42*   (2006.01)
*B01J 23/63*   (2006.01)
*B01J 21/06*   (2006.01)

(52) U.S. Cl. ........ 502/304; 502/300; 502/302; 502/325; 502/339; 502/349

(58) Field of Classification Search .................. 502/227, 502/240, 242, 304, 300, 302, 325, 339, 349
See application file for complete search history.

(56) References Cited

U.S. PATENT DOCUMENTS

| 4,537,873 | A | * | 8/1985 | Kato et al. ................. 502/242 |
| 4,843,056 | A | * | 6/1989 | Matsumoto et al. ........ 502/302 |
| 5,626,826 | A | * | 5/1997 | Chopin et al. ............ 423/213.2 |
| 6,150,288 | A | * | 11/2000 | Suzuki et al. ............... 501/105 |
| 6,455,182 | B1 |   | 9/2002 | Silver |

(Continued)

FOREIGN PATENT DOCUMENTS
JP          2005-58972          3/2005

(Continued)

OTHER PUBLICATIONS

Thesis entitled "Supported Pt-Ce Catalysts for Ultra Low-Temperature Water Gas Shift Reaction and Their Non-Pyrophoric Property for Fuel Cell Application" disclosed Nov. 8, 2007 at the *Samsung Technology Conference 2007*.

(Continued)

*Primary Examiner* — Roy King
*Assistant Examiner* — Jared Wood
(74) *Attorney, Agent, or Firm* — Stein McEwen, LLP

(57) ABSTRACT

Provided are a non-pyrophoric water gas shift reaction catalyst including: an oxide carrier composed of zirconium oxide ($ZrO_2$) and at least one selected from yttrium oxide ($Y_2O_3$) and cerium oxide ($CeO_2$); and platinum (Pt) and cerium (Ce) that are supported on the oxide carrier, a method of preparing the same, and a fuel processor including the non-pyrophoric water gas shift reaction catalyst.

8 Claims, 14 Drawing Sheets

U.S. PATENT DOCUMENTS

| | | | |
|---|---|---|---|
| 6,777,117 B1 * | 8/2004 | Igarashi et al. | 429/412 |
| 6,846,475 B1 | 1/2005 | Taguchi et al. | |
| 7,166,263 B2 | 1/2007 | Vanderspurt et al. | |
| 2004/0184986 A1 | 9/2004 | Hagemeyer et al. | |
| 2004/0266616 A1 | 12/2004 | Teshigawara et al. | |
| 2005/0031920 A1 | 2/2005 | Igarashi et al. | |
| 2006/0111457 A1 | 5/2006 | Lee et al. | |

FOREIGN PATENT DOCUMENTS

| | | | |
|---|---|---|---|
| JP | 2005058972 A * | 3/2005 | |
| JP | 2005-199114 | 7/2005 | |
| JP | 2005270882 A * | 10/2005 | |
| KR | 10-0386435 | 6/2003 | |
| KR | 10-2005-0079567 | 8/2005 | |
| KR | 10-0614893 | 8/2006 | |

OTHER PUBLICATIONS

English abstract of KR 10-2004-0063130 (Jul. 2004).
English abstract of KR 10-2001-0092261 (Oct. 2001).
Prior Art Search Report, Sep. 6, 2007.

* cited by examiner

NON-PYROPHORIC CATALYST FOR WATER-GAS SHIFT REACTION AND METHOD OF PREPARING THE SAME

CROSS-REFERENCE TO RELATED PATENT APPLICATION

This application claims the benefit of Korean Patent Application No. 10-2007-0140671, filed on Dec. 28, 2007, in the Korean Intellectual Property Office, the disclosure of which is incorporated herein in its entirety by reference.

BACKGROUND OF THE INVENTION

1. Field of the Invention

The present invention relates to a non-pyrophoric catalyst for a water-gas shift reaction and a method of preparing the same.

2. Description of the Related Art

Fuel cell systems consist of a fuel cell stack, a fuel processor (FP), a fuel tank, and a fuel pump. The fuel cell stack is a main body of a fuel cell, and has a structure in which several to several tens of unit cells each including a membrane electrode assembly (MEA) and a separator are stacked.

The fuel pump supplies fuel in the fuel tank to the fuel processor. The fuel processor produces hydrogen by reforming and purifying the fuel and supplies the hydrogen to the fuel cell stack. The fuel cell stack receives the hydrogen and generates electrical energy by electrochemical reaction of the hydrogen with oxygen.

A reformer of the fuel processor reforms hydrocarbon using a reforming catalyst. The hydrocarbon contains a sulfur compound. Since the reforming catalyst can be easily poisoned by the sulfur compound, it is necessary to remove the sulfur compound prior to reforming hydrocarbon. Thus, the hydrocarbon is subjected to desulfurization prior to the reforming process.

In hydrocarbon reforming, carbon dioxide ($CO_2$) and a small amount of carbon monoxide (CO) are produced, together with hydrogen. Since CO acts as a catalyst poison in electrodes of the fuel cell stack, reformed fuel cannot be directly supplied to the fuel cell stack. Thus, a CO removal process is needed. It is preferable to reduce the CO amount to less than 10 ppm.

CO can be removed by a high temperature shift reaction represented by Reaction Scheme 1 below:

$$CO + H_2O \rightarrow CO_2 + H_2 \qquad \text{<Reaction Scheme 1>}$$

The high-temperature shift reaction is performed at a temperature of 400 to 500° C. The high-temperature shift reaction can be followed by a low temperature shift reaction at a temperature of 200 to 300° C. However, even after these reactions are performed, it is very difficult to reduce the CO amount to less than 5,000 ppm.

To address this problem, a preferential oxidation (PROX) reaction represented by Reaction Scheme 2 below can be used:

$$CO + \tfrac{1}{2}O_2 \rightarrow CO_2 \qquad \text{<Reaction Scheme 2>}$$

The high temperature shift reaction and the low temperature shift reaction are reversible reactions depending on temperature. Thus, at low temperatures, carbon monoxide is effectively removed, but the reaction rate of a catalyst is reduced. Accordingly, a catalyst which has excellent activity at a low temperature is required.

Generally, a Cu—Zn based catalyst is used as a low temperature shift reaction catalyst. A Cu—Zn based catalyst can start a shift reaction of carbon monoxide at 250° C. or lower, but has a heat resistance temperature of around 300° C. Thus, the shift reaction temperature should not exceed the heat resistance temperature during the shift reaction. Accordingly, the shift reaction should be performed slowly for activity and stability of the Cu—Zn catalyst, resulting in a long time for reduction and activation.

In addition, when the starting-up and stopping of a fuel processor is repeated, air flows into the fuel processor. Since Cu—Zn based catalysts have a pyrophoric property, it is recommended that inert gas such as $N_2$ be injected into the apparatus to protect the Cu—Zn based catalyst.

SUMMARY OF THE INVENTION

The present invention provides a non-pyrophoric water gas shift reaction catalyst which has an excellent reaction activity even at a low temperature, which is a catalyst for a one-step shift reaction at a low temperature, a method of preparing the same, and a fuel processor using the non-pyrophoric water gas shift reaction catalyst.

According to an aspect of the present invention, there is provided a non-pyrophoric water gas shift reaction catalyst comprising: an oxide carrier composed of zirconium oxide ($ZrO_2$) and at least one selected from yttrium oxide ($Y_2O_3$) and cerium oxide ($CeO_2$); and platinum (Pt) and cerium (Ce) that are supported on the oxide carrier.

According to another aspect of the present invention, there is provided a method of preparing a non-pyrophoric water gas shift reaction catalyst, comprising; (a) adding a platinum precursor, a cerium precursor, and a composite oxide carrier composed of zirconium oxide ($ZrO_2$) and at least one selected from cerium oxide ($CeO_2$) and yttrium oxide ($Y_2O_3$) to a dispersing medium and uniformly mixing the mixture; (b) drying the mixture; and (c) sintering the dried resultant.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
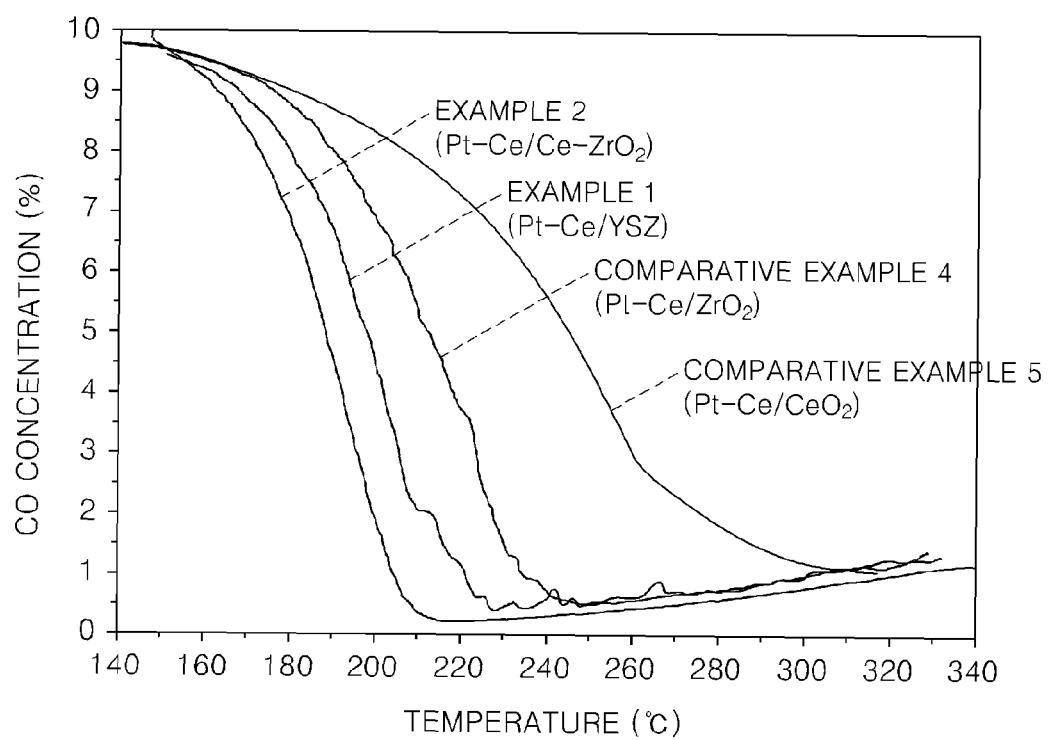
FIG. 1 is a graph showing a change in CO concentration according to shift reaction temperature of catalysts prepared in Examples 1 and 2 and Comparative Examples 4 and 5.

Hereinafter, the present invention will be described in detail by explaining embodiments of the invention with reference to the attached drawings.

The present invention provides a non-pyrophoric water-gas shift reaction catalyst including: an oxide carrier composed of zirconium oxide ($ZrO_2$) and at least one selected from yttrium oxide ($Y_2O_3$) and cerium oxide ($CeO_2$); and platinum (Pt) and cerium (Ce) supported on the oxide carrier.

$ZrO_2$ is an essential carrier of the non-pyrophoric water-gas shift reaction catalyst of the present invention. The amount of $ZrO_2$ may be in a range of 50 to 95 parts by weight based on 100 parts by weight of the oxide carrier. When the amount of $ZrO_2$ is less than 50 parts by weight based on 100 parts by weight of the oxide carrier, the relative amount of $Y_2O_3$ or $CeO_2$ is too large, and thus activity of the non-pyrophoric water-gas shift reaction catalyst is degraded. When the amount of $ZrO_2$ is greater than 95 parts by weight based on 100 parts by weight of the oxide carrier, the amount of $Y_2O_3$ or $CeO_2$ is too small, and thus effects of the non-pyrophoric water-gas shift reaction catalyst are insignificant.

The oxide carrier may be $Y_2O_3$—$ZrO_2$, $CeO_2$—$ZrO_2$, or $CeO_2$—$Y_2O_3$—$ZrO_2$.

In the case of using $Y_2O_3$—$ZrO_2$ as the oxide carrier, the amount of $Y_2O_3$ may be in a range of 5 to 20 parts by weight based on 100 parts by weight of the total weight of the oxide carrier, and the amount of $ZrO_2$ may be in a range of 80 to 95 parts by weight based on 100 parts by weight of the oxide carrier. When the amount of $Y_2O_3$ is greater than 20 parts by weight based on 100 parts by weight of the total weight of the oxide carrier, activity of the non-pyrophoric water-gas shift reaction catalyst is degraded. When the amount of $Y_2O_3$ is less than 5 parts by weight based on 100 parts by weight of the total weight of the oxide carrier, effects of the non-pyrophoric water-gas shift reaction catalyst are insignificant.

In the case of using $CeO_2$—$ZrO_2$ as the oxide carrier, the amount of $CeO_2$ may be in a range of 5 to 30 parts by weight based on 100 parts by weight of the total weight of the oxide carrier, and the amount of $ZrO_2$ may be in a range of 70 to 95 parts by weight based on 100 parts by weight of the oxide carrier. When the amount of $CeO_2$ is greater than 30 parts by weight based on 100 parts by weight of the total weight of the oxide carrier, activity of the non-pyrophoric water-gas shift reaction catalyst is degraded. When the amount of $CeO_2$ is less than 5 parts by weight based on 100 parts by weight of the total weight of the oxide carrier, effects of the non-pyrophoric water-gas shift reaction catalyst are insignificant.

In the case of using $CeO_2$—$Y_2O_3$—$ZrO_2$ as the oxide carrier, the amount of $CeO_2$ may be in a range of 5 to 30 parts by weight based on 100 parts by weight of the total weight of the oxide carrier, the amount of $Y_2O_3$ may be in a range of 5 to 20 parts by weight based on 100 parts by weight of the oxide carrier, and the amount of $ZrO_2$ may be in a range of 50 to 90 parts by weight based on 100 parts by weight of the total weight of the oxide carrier.

The specific surface area of the oxide carrier may be in the range of 10 to 1000 $m^2/g$. When the specific surface area of the oxide carrier is less than 10 $m^2/g$, the degree of dispersion of supported Pt and Ce is small to have insufficient catalyst activity. When the specific surface area of the oxide carrier is greater than 1000 $m^2/g$, mechanical properties of the oxide carrier deteriorate.

The amount of Pt may be in a range of 0.5 to 5 parts by weight based on 100 parts by weight of the total weight of the non-pyrophoric water-gas shift reaction catalyst. When the amount of Pt is less than 0.5 parts by weight based on 100 parts by weight of the total weight of the non-pyrophoric water-gas shift reaction catalyst, the activity of the non-pyrophoric water-gas shift reaction catalyst deteriorate. When the amount of Pt is greater than 5 parts by weight based on 100 parts by weight of the total weight of the non-pyrophoric water-gas shift reaction catalyst, it is uneconomical because the increase of the catalyst activity is insignificant.

In the non-pyrophoric water-gas shift reaction catalyst of the present invention, the amount of Ce may be in a range of 1 to 20 mole based on 1 mole of Pt. That is, a mixed molar ratio of Ce to Pt may be preferably in a range of 1:1 to 20:1, more preferably in a range of 2:1 to 15:1, and most preferably 10:1.

When the mixed molar ratio of Ce to Pt is greater than 20:1, the catalyst activity deteriorates due to an increase in a relative amount of Ce. When the mixed molar ratio of Ce to Pt is less than 1:1, the effect of addition of Ce is insufficient.

The average particle diameter of Pt in the non-pyrophoric water-gas shift reaction catalyst may be in a range of 1 to 10 nm. When the average particle diameter of Pt is less than 1 nm, the particle diameter of Pt is small to have insufficient catalyst activity. When the average particle diameter is greater than 10 nm, the platinum particles aggregate, which is disadvantageous in catalyst activity.

In addition, when the degree of platinum dispersion is in a range of 70 to 99%, the catalyst activity is optimized.

The non-pyrophoric water-gas shift reaction catalyst of the present invention has such composition as described above, and thus is operable at a temperature in a range of 230° C. or lower and has high activity and thermal stability in the water-gas shift (WGS) reaction of CO. In addition, the non-pyrophoric water-gas shift reaction catalyst has a high CO conversion rate and low CO exit concentration, and thus can be applied in a high temperature polymer electrolyte membrane fuel cell (PEMFC). In addition, the non-pyrophoric water-gas shift reaction catalyst has a non-pyrophoric property, and thus can be operable without nitrogen.

The present invention also provides a method of preparing a non-pyrophoric water-gas shift reaction catalyst.

First, a platinum precursor, a cerium precursor, and a composite oxide carrier composed of $ZrO_2$ and at least one selected from $CeO_2$ and $Y_2O_3$, are added to a dispersing medium, and the mixture is uniformly mixed.

Next, the mixture is dried, and the dried resultant is sintered to obtain a desired non-pyrophoric water-gas shift reaction catalyst. As described above, the platinum precursor and the cerium precursor are simultaneously dispersed in the oxide carrier, $ZrO_2$ is an essential constituent of the oxide carrier, and $CeO_2$ and $Y_2O_3$ are optional constituents.

The platinum precursor may be formed of $Pt(NH_3)_4$ $(NO_3)_2$, although the present invention is not limited thereto. The cerium precursor may be formed of $Ce(NO_3)_2.6H_2O$, although the present invention is not limited thereto.

Methods of uniformly mixing the platinum precursor, the cerium precursor, and the oxide carrier are not specifically limited. For example, the platinum precursor, the cerium precursor, and the oxide carrier may be stirred for 1 to 12 hours. Also, the mixing temperature may be in a range of 40 to 80° C.

The amount of the platinum precursor is adjusted such that the amount of Pt in the platinum precursor is in a range of 0.5 to 5 parts by weight based on 100 parts by weight of the total weight of the precursor of the oxide carrier, and the amount of the cerium precursor is adjusted such that the amount of Ce in the cerium precursor is in a range of 1 to 20 mole based 1 mole of Pt.

When the amount of Pt in the Pt precursor is less than 0.5 parts by weight based on 100 parts by weight of the total weight of the precursor of the oxide carrier, the catalyst activity is insufficient. When the amount of Pt in the Pt precursor is greater than 5 parts by weight based on 100 parts by weight of the total weight of the precursor of the oxide carrier, it is uneconomical because the increase of the catalyst activity is insignificant. When the amount of Ce in the Ce precursor is less than 1 mole based on 1 mole of Pt, improvement in catalyst activity is insignificant. When the amount of Ce in the Ce precursor is greater than 20 mole based on 1 mole of Pt, it is uneconomical because the increase of the catalyst activity is insignificant.

The dispersing medium is a solvent considering that it dissolves the platinum precursor and the cerium precursor. However, since it does not dissolve the oxide carrier, it is called the dispersing medium. The dispersing medium is not specifically limited as long as it dissolves the platinum precursor and the cerium precursor, and disperses the oxide carrier. Examples of the dispersing medium include water and an alcohol-based solvent. The alcohol-based solvent, for example, may be methanol, ethanol, isopropyl alcohol, butyl alcohol, or the like, but is not limited thereto.

The mixture is vaporized under reduced pressure at 40 to 80° C. and dried to remove the dispersing medium. The mixture may be dried at 80 to 120° C. for 6 to 24 hours. The mixture may be dried in vacuum or in an oven.

After removing the dispersing medium, such as water or alcohol-based solvent, by drying the mixture, the resultant is put into a sealed heating space, such as an oven, to be sintered. The sintering process may be performed at 300 to 700° C. for 2 to 24 hours.

When the sintering temperature is lower than 300° C., a crystal structure of the catalyst is not satisfactorily formed. When the sintering temperature is greater than 700° C., the size of the supported metal becomes big, which reduces reaction activity. In addition, when the sintering time is less than 2 hours, the crystal structure of the catalyst may not be sufficiently formed. When the sintering time is greater than 24 hours, it is uneconomical since the amount of time spent is too long. The sintering process may be performed in air, and is not specifically limited.

Finally, the sintered resultant is reduced to obtain the non-pyrophoric water-gas shift reaction catalyst having an activity as a shift reaction catalyst. The reduction may be performed at 200 to 500° C. for 1 to 12 hours. The reduction may be performed under a hydrogen atmosphere, and the reduction atmosphere may further include inert gas, such as helium, nitrogen, neon, and the like.

According to another embodiment of the present invention, an oxide carrier formed of $ZrO_2$ and at least one selected from $CeO_2$ and $Y_2O_3$ may be prepared by mixing a precursor of the oxide carrier with an organic solution comprising an acid and ethylene glycol, and heating and sintering the mixture.

Next, the prepared oxide carrier is wet impregnated with a platinum precursor and a cerium precursor, and the resultant is dried and sintered to obtain a non-pyrophoric water-gas shift reaction catalyst.

The oxide carrier may be a commercially available carrier, or may be prepared using a general co-impregnation method or a sol-gel method.

The co-impregnation method is performed by mixing a precursor of an oxide carrier formed of at least one selected from $CeO_2$ and $Y_2O_3$ and a precursor of an oxide carrier of $ZrO_2$ together with water, adding NaOH, $Na_2CO_3$, or $K_2CO_3$ to the mixture and mixing the mixture, filtering and washing the resultant, and then sintering the mixture.

The sol-gel method is performed by mixing a precursor of an oxide carrier formed of at least one selected from $CeO_2$ and $Y_2O_3$ and a precursor of an oxide carrier of $ZrO_2$ together with a mixed solution of an acid and ethylene glycol and heating the mixture, and then sintering the mixture.

The amount of the zirconium oxide in the precursor of the zirconium oxide is in a range of 50 to 95 parts by weight based on 100 parts by weight of the total weight of the oxide in the precursor of the oxide carrier.

When the precursor of the oxide carrier is composed of a precursor of cerium oxide ($CeO_2$) and a precursor of zirconium oxide ($ZrO_2$), the amount of the cerium oxide in the precursor of the cerium oxide is in a range of 5 to 30 parts by weight based on 100 parts by weight of the total weight of the oxide carrier in the precursor of the oxide carrier, and the amount of the zirconium oxide in the precursor of the zirconium oxide is in a range of 70 to 95 parts by weight based on 100 parts by weight of the total weight of the oxide carrier in the precursor of the oxide carrier.

A Zr precursor of the $ZrO_2$ may comprise at least one selected from the group consisting of $ZrO(NO_3)_2$, $ZrCl_4$, $Zr(OC(CH_3)_3)_4$, $Zr(O(CH_2)_3CH_3)_4$, $(CH_3CO_2)Zr(OH)$, $ZrOCl_2$, $Zr(SO_4)_2$, and $Zr(OCH_2CH_2CH_3)_4$; however, the present invention is not limited thereto.

A Ce precursor of the $CeO_2$ may comprise at least one selected from the group consisting of $Ce(NO_3)_3.6H_2O$, $Ce(CH_3CO_2)_3$, $Ce(CO_3)_3$, $CeCl_3$, $(NH_4)_2Ce(NO_3)_6$, $(NH_4)_2Ce(SO_4)_4$, $Ce(OH)_4$, $Ce_2(C_2O_4)_3$, $Ce(ClO_4)_3$, and $Ce_2(SO_4)_3$; however, the present invention is not limited thereto.

A Y precursor of the $Y_2O_3$ may comprise at least one selected from the group consisting of $Y(NO_3)_3.6H_2O$, $Y(NO_3)_3.4H_2O$, $[(CH_3)_2CHO]_3Y$, $Y_2(C_2O_4)_3.4H_2O$, $YCl_3$, $YCl_3.6H_2O$, and $[CH_3(CH_2)_3CH(C_3H_5)CO_2]_3Y$; however, the present invention is not limited thereto.

The acid may be an inorganic acid, such as citric acid, acetic acid, hydrochloric acid, sulfuric acid, nitric acid, phosphoric acid, or boric acid, or may be an organic acid, such as $C_{1-20}$ aliphatic carboxylic acid or $C_{1-30}$ aromatic carboxylic acid, but is not limited thereto.

The amounts of acid and ethylene glycol may be 5 to 20 parts by weight of acid and 10 to 60 parts by weight of ethylene glycol based on 1 part by weight of the precursor of the oxide carrier.

When the amounts of acid and ethylene glycol exceed the above ranges, the sintering process takes a long time. When the amounts of acid and ethylene glycol are below the above ranges, the precursors may not mix well.

The precursor of the oxide carrier is mixed with an organic solution and heated, and the mixture is sintered to prepare the oxide carrier. The sintering process may be performed at 400 to 700° C. for 2 to 24 hours.

Next, the prepared oxide carrier is wet impregnated with the platinum precursor and the cerium precursor. At this time, the amounts of the platinum precursor and the cerium precursor based on the precursor of the oxide carrier are as described above.

Subsequently, the resultant is dried, sintered and then reduced to prepare a non-pyrophoric water-gas shift reaction catalyst having an activity as a shift reaction catalyst. Herein, the sintering process may be performed at 300 to 700° C. for 2 to 24 hours.

The non-pyrophoric water-gas shift reaction catalyst of the present invention can be operable at a temperature in a range of 230° C. or lower, and can be a catalyst for one-step shift reaction that can replace a conventional 2-step WGS reaction. In addition, when the starting-up and stopping of a fuel processor are repeated, the catalyst is stable even if air flows into the fuel processor. Thus, there is no need to purge the fuel processor with nitrogen for protecting the catalyst. As such, the catalyst of the present invention has excellent activity at a low temperature and excellent non-pyrophoric properties.

The present invention also provides a fuel processor including the non-pyrophoric water gas shift reaction catalyst. Hereinafter, the fuel processor will be described.

The fuel processor may include a desulfurizer, a reformer, a high temperature shift reaction apparatus, a low temperature shift reaction apparatus, and a PROX reaction apparatus. The non-pyrophoric water gas shift reaction catalyst of the present invention may be included in the low temperature shift reaction apparatus. In addition, the fuel processor may include a single shift reaction apparatus instead of including the high temperature shift reaction apparatus and the low temperature shift reaction apparatus, and thus the catalyst of the present invention may be charged inside the single shift reaction apparatus in order to achieve the objective of the present invention. Since the non-pyrophoric water gas shift reaction catalyst of the present invention effectively removes carbon monoxide, it can be used in such a single reaction apparatus as described above.

The desulfurizer is an apparatus used to remove a sulfide which poisons a catalyst included in an apparatus used for a subsequent process. The desulfurizer may use an adsorber, well known in the related art, to adsorb the sulfide, or a hydrodesulfurization process.

The reformer is an apparatus used to prepare hydrogen gas by reforming hydrocarbon supplied as fuel. As a reforming catalyst, a catalyst well known in the art may be used, such as platinum, ruthenium, or nickel.

The high temperature and low temperature shift reaction apparatuses are apparatuses used to remove carbon monoxide which poisons a catalyst layer of a fuel cell. These apparatuses reduce carbon monoxide concentration to below 1%. The non-pyrophoric water gas shift reaction catalyst of the present invention may be included in the low temperature shift reaction apparatus. The non-pyrophoric water gas shift reaction catalyst, for example, can be fixed inside the low temperature shift reaction apparatus and be charged to be used. In addition, the high temperature shift reaction apparatus and the low temperature shift reaction apparatus may be replaced by a single shift reaction apparatus. The single shift reaction apparatus may be charged with the non-pyrophoric shift reaction catalyst of the present invention. Since the non-pyrophoric shift reaction catalyst can excellently remove carbon monoxide, it can be used in a single shift reaction apparatus.

The present invention also provides a fuel cell system including the non-pyrophoric water gas shift reaction catalyst.

The fuel cell system includes a fuel processor and a fuel cell stack. The fuel processor may include a desulfurizer, a reformer, a high temperature shift reaction apparatus, a low temperature shift reaction apparatus, and a PROX reaction apparatus as described above. The fuel cell stack can be formed by stacking or disposing a plurality of unit fuel cells. Such a unit fuel cell includes a cathode, an anode, and an electrolyte membrane disposed therebetween.

The non-pyrophoric water gas shift reaction catalyst can be included in the fuel processor, and more particularly, included in the shift reaction apparatus.

Hereinafter, the present invention will be described more specifically with reference to the following Examples. These examples are for illustrative purposes only and are not intended to limit the scope of the present invention.

EXAMPLE 1

0.22 g of $Pt(NH_3)_4(NO_3)_2$ and 2.49 g of $Ce(NO_3)_2 \cdot 6H_2O$ were added to 50 ml of water, 10 g of $Y_2O_3$—$ZrO_2$ (Tosoh company, YSZ, TZ-8YS) was added to the mixture, and then the mixture was stirred at 60° C. for 6 hours to prepare a uniform mixture.

The mixture was dried in vacuum at 60° C. to remove a solvent, and then the resultant was dried in an oven at 110° C. for 12 hours and sintered at 500° C. for 1 hour under an air atmosphere to prepare Pt—Ce/$Y_2O_3$—$ZrO_2$. In the prepared Pt—Ce/$Y_2O_3$—$ZrO_2$ (YSZ), the amounts of $Y_2O_3$ and $ZrO_2$ were 5 parts by weight and 95 parts by weight, respectively, based on 100 parts by weight of the total weight of $Y_2O_3$—$ZrO_2$. A molar ratio of Ce to Pt was 10:1. The amount of Pt was 1 part by weight based on 100 parts by weight of the total weight of the catalyst. The resultant was reduced in an oven at 400° C. for 2 hours under a hydrogen atmosphere. Then, the reaction activity of the catalyst was evaluated.

EXAMPLE 2

Pt—Ce/$CeO_2$—$ZrO_2$ was prepared in the same manner as in Example 1, except that 10 g of $CeO_2$—$ZrO_2$ (Daiichi Kigenso company, Z-1174) was used instead of $Y_2O_3$—$ZrO_2$ (Tosoh company, YSZ, TZ-8YS). In the prepared Pt—Ce/$CeO_2$—$ZrO_2$, the amounts of $CeO_2$ and $ZrO_2$ was 25 parts by weight and 75 parts by weight, respectively, based on 100 parts by weight of the total weight of $CeO_2$ and $ZrO_2$. A molar ratio of Ce to Pt was 10:1. The amount of Pt was 1 part by weight based on 100 parts by weight of the total weight of the catalyst.

COMPARATIVE EXAMPLE 1

Pt—Ce/γ-$Al_2O_3$ was prepared in the same manner as in Example 1, except that 10 g of γ-$Al_2O_3$ (Aldrich company) was used instead of $Y_2O_3$—$ZrO_2$ (Tosoh company, YSZ, TZ-8YS). Herein, a molar ratio of Ce to Pt was 10:1, and the amount of Pt was 1 part by weight based on 100 parts by weight of the total weight of the catalyst.

COMPARATIVE EXAMPLE 2

Pt—Ce/$TiO_2$ was prepared in the same manner as in Comparative Example 1, except that 10 g of $TiO_2$ (Degussa, P25) was used instead of γ-$Al_2O_3$ (Aldrich company). Herein, a molar ratio of Ce to Pt was 10:1, and the amount of Pt was 1 part by weight based on 100 parts by weight of the total weight of the catalyst.

COMPARATIVE EXAMPLE 3

Pt—Ce/SiO$_2$ was prepared in the same manner as in Comparative Example 1, except that 10 g of SiO$_2$ (Aldrich company) was used instead of γ-Al$_2$O$_3$ (Aldrich company). Herein, a molar ratio of Ce to Pt was 10:1, and the amount of Pt was 1 part by weight based on 100 parts by weight of the total weight of the catalyst.

COMPARATIVE EXAMPLE 4

Pt—Ce/ZrO$_2$ was prepared in the same manner as in Comparative Example 1, except that 10 g of ZrO$_2$ (Aldrich) was used instead of γ-Al$_2$O$_3$ (Aldrich company). Herein, a molar ratio of Ce to Pt was 10:1, and the amount of Pt was 1 part by weight based on 100 parts by weight of the total weight of the catalyst.

COMPARATIVE EXAMPLE 5

Pt—Ce/CeO$_2$ was prepared in the same manner as in Comparative Example 1, except that 10 g of CeO$_2$ (Aldrich) was used instead of γ-Al$_2$O$_3$ (Aldrich company).

COMPARATIVE EXAMPLE 6

Pt/CeO$_2$—ZrO$_2$ was prepared in the same manner as in Example 2, except that only 0.22 g of Pt(NH$_3$)$_4$(NO$_3$)$_2$ instead of 0.22 g of Pt(NH$_3$)$_4$(NO$_3$)$_2$ and 2.49 g of Ce(NO$_3$).6H$_2$O was added to 50 ml of water.

COMPARATIVE EXAMPLE 7

Pt/YSZ was prepared in the same manner as in Example 1, except that only 0.22 g of Pt(NH$_3$)$_4$(NO$_3$)$_2$ instead of 0.22 g of Pt(NH$_3$)$_4$(NO$_3$)$_2$ and 2.49 g of Ce(NO$_3$).6H$_2$O was added to 50 ml of water.

COMPARATIVE EXAMPLE 8

Pt/ZrO$_2$ was prepared in the same manner as in Comparative Example 4, except that only 0.22 g of Pt(NH$_3$)$_4$(NO$_3$)$_2$ instead of 0.22 g of Pt(NH$_3$)$_4$(NO$_3$)$_2$ and 2.49 g of Ce(NO$_3$).6H$_2$O was added to 50 ml of water.

A shift reaction experiment was performed on the catalysts prepared in Examples 1 and 2 and Comparative Examples 1 through 4. The shift reaction experiment was performed by supplying water (steam) into gas containing 10 vol % of carbon monoxide, 10 vol % of carbon dioxide, and 80 vol % of hydrogen, wherein the ratio of water to carbon monoxide was 6:1, and the water was flowed with a GHSV of 6,000 (hr$^{-1}$). The results are shown in Table 1 below.

As shown in Table 1, the conversion rate of carbon monoxide in Examples 1 and 2 was at least 95%, which is higher compared to Comparative Examples 1 through 4. Also, the reaction temperature in Examples 1 and 2 was less than 230° C., which is lower than that of Comparative Examples 1 through 4.

A shift reaction experiment was performed on the catalysts prepared in Examples 1 and 2 and Comparative Examples 4 and 5. The shift reaction experiment was performed by supplying water (steam) into gas containing 10 vol % of carbon monoxide, 10 vol % of carbon dioxide, and 80 vol % of hydrogen, wherein the ratio of water to carbon monoxide was 6:1, and the water was flowed with a GHSV of 6,000 (hr$^{-1}$). FIG. 1 is a graph showing a charge in CO concentration according to a water gas shift (WGS) reaction temperature of catalysts prepared in Examples 1 and 2 and Comparative Examples 4 and 5.

Referring to FIG. 1, the catalysts of Examples 1 and 2 had excellent CO removal activity compared to the catalysts of Comparative Examples 4 and 5. In addition, it can be seen that such excellent catalyst activity is possible at a temperature of 230° C. or less.

EVALUATION EXAMPLE 1

Figure 2:
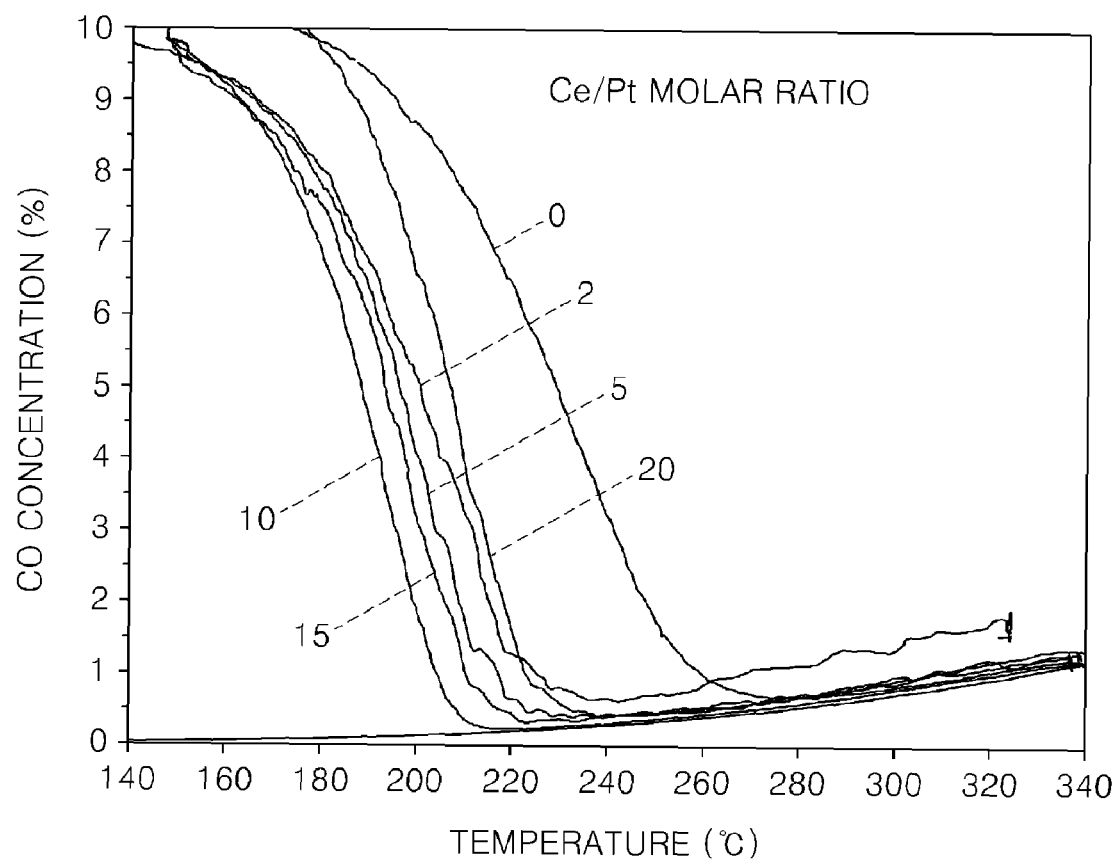
FIG. 2 is a graph showing a change in CO concentration according to water-gas shift (WGS) temperature of a catalyst prepared in Evaluation Example 1.
Figure 3:
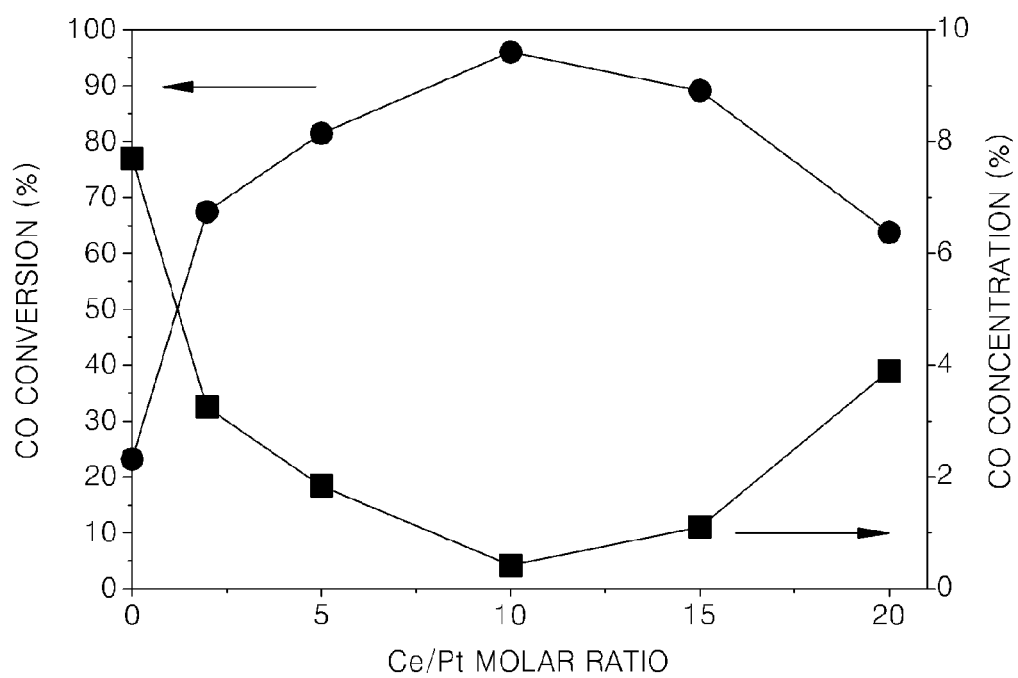
FIG. 3 is a graph showing a change in CO conversion rate according to WGS temperature of a catalyst prepared in Evaluation Example 1.

Catalysts were prepared in the same manner as in Example 2, except that the amount of Pt was 1 part by weight, and a mixed molar ratio of Ce to Pt was varied as in Table 2 below. FIG. 2 is a graph showing a change in CO concentration according to water-gas shift (WGS) temperature of a catalyst prepared in Evaluation Example 1, and FIG. 3 is a graph showing a change in CO conversion rate according to WGS temperature of the catalyst prepared in Evaluation Example 1. Herein, the water gas shift reaction was performed by supplying water (steam) into gas containing 10 vol % of carbon monoxide, 10 vol % of carbon dioxide, and 80 vol % of hydrogen, wherein the ratio of water to carbon monoxide was 6:1, and the water was flowed with a GHSV of 6,000 (hr$^{-1}$).

TABLE 2

| | Ce/Pt molar ratio |
| --- | --- |
| # 1 | 0 |
| # 2 | 2 |
| # 3 | 5 |
| # 4 | 10 |
| # 5 | 15 |
| # 6 | 20 |

Referring to FIGS. 2 and 3, in the case of the molar ratio of Ce to Pt in the range of 2:1 to 20:1, the catalyst had excellent

TABLE 1

| | Reaction temperature (° C.) | CO conversion (%) | CO concentration (%) | H$_2$ concentration (%) | CO$_2$ concentration (%) | CH$_4$ concentration (%) |
| --- | --- | --- | --- | --- | --- | --- |
| Example 1 | 228 | 95.4 | 0.40 | 82.6 | 17.1 | 0 |
| Example 2 | 210 | 97.4 | 0.24 | 82.6 | 17.3 | 0 |
| Comparative Example 1 | 259 | 93.8 | 0.52 | 82.7 | 16.9 | 0 |
| Comparative Example 2 | 269 | 87.6 | 0.50 | 82.4 | 16.7 | 0 |
| Comparative Example 3 | 250 | 94.2 | 0.40 | 80.9 | 18.6 | 0 |
| Comparative Example 4 | 242 | 94.7 | 0.24 | 82.6 | 16.9 | 0 | activity at a low temperature. In particular, when the molar ratio of Ce to Pt was 10:1, the catalyst had the best activity.

EVALUATION EXAMPLE 2

Figure 4:
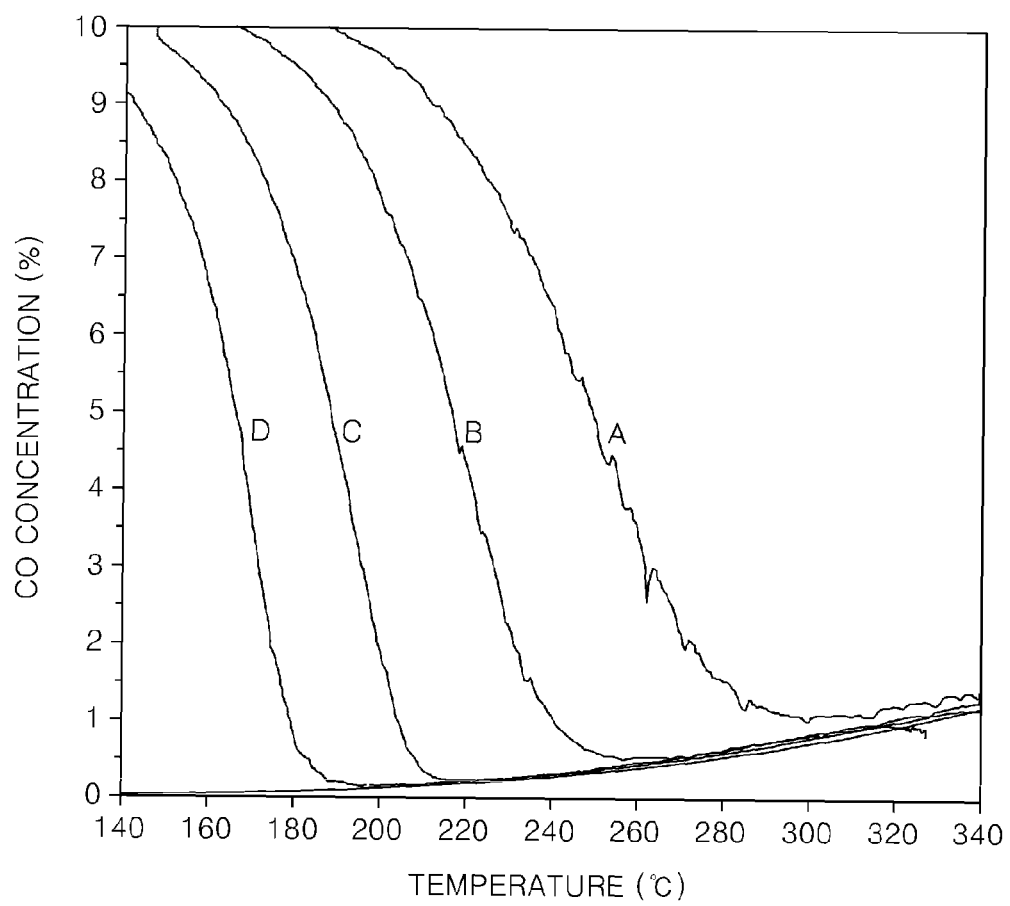
FIG. 4 is a graph showing a change in CO concentration according to WGS temperature of a catalyst prepared in Evaluation Example 2.

Catalysts were prepared in the same manner as in Example 2, except that the amount of Ce was 7 parts by weight based on 100 parts by weight of the total weight of the catalyst, and the amount of Pt and a molar ratio of Pt to Ce were varied as in Table 3 below. FIG. 4 is a graph showing a change in CO concentration according to WGS temperature of a catalyst prepared in Evaluation Example 2. Herein, the water gas shift reaction was performed by supplying water (steam) into gas containing 10 vol % of carbon monoxide, 10 vol % of carbon dioxide, and 80 vol % of hydrogen, wherein the ratio of water to carbon monoxide was 6:1, and the water was flowed with a GHSV of 6,000 ($hr^{-1}$).

TABLE 3

|   | Pt amount (parts by weight) | Ce/Pt molar ratio |
|---|---|---|
| A | 0.2 | 50 |
| B | 0.5 | 20 |
| C | 1.0 | 10 |
| D | 2.5 | 4 |

Referring to FIG. 4, the larger the amount of Pt, the higher the activity of CO removal. In addition, CO removal is possible at a lower temperature.

EVALUATION EXAMPLE 3

Figure 5:
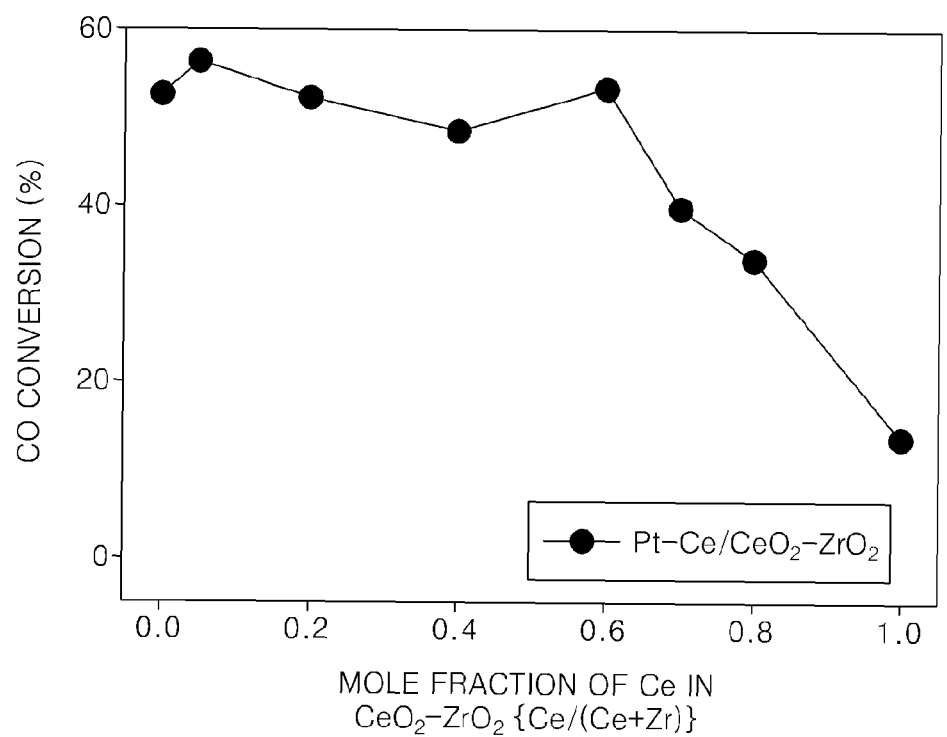
FIG. 5 is a graph showing CO conversion rate with respect to a mole fraction of Ce in a carrier cerium oxide ($CeO_2$)-zirconium oxide ($ZrO_2$) of a catalyst prepared in Evaluation Example 3.
Figure 6:
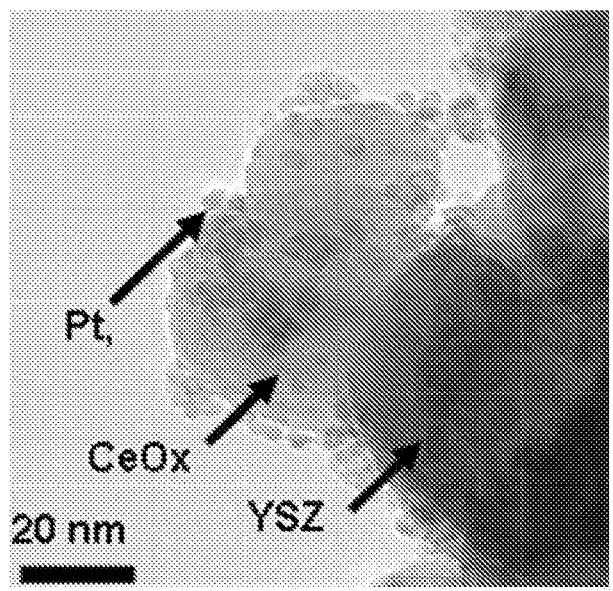
FIGS. 6 through 9 are transmission electron microscopic (TEM) images of catalysts prepared in Example 1, Example 2, Comparative Example 4, and Comparative Example 8, respectively.
Figure 7:
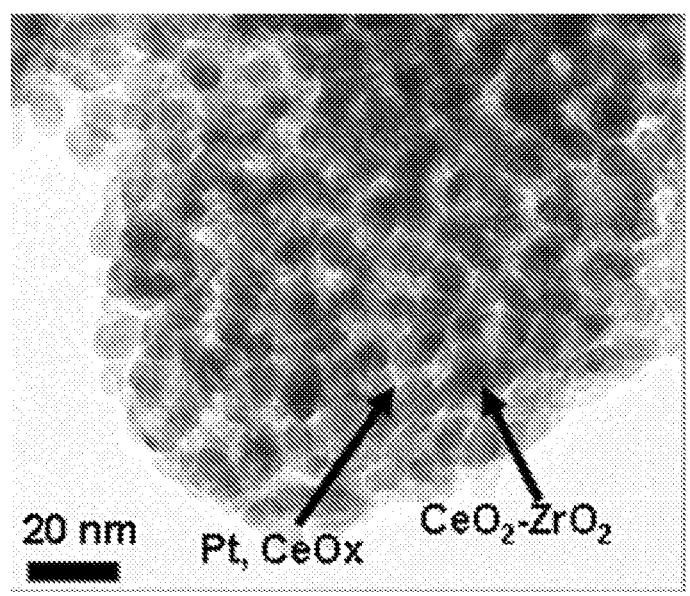
Figure 8:
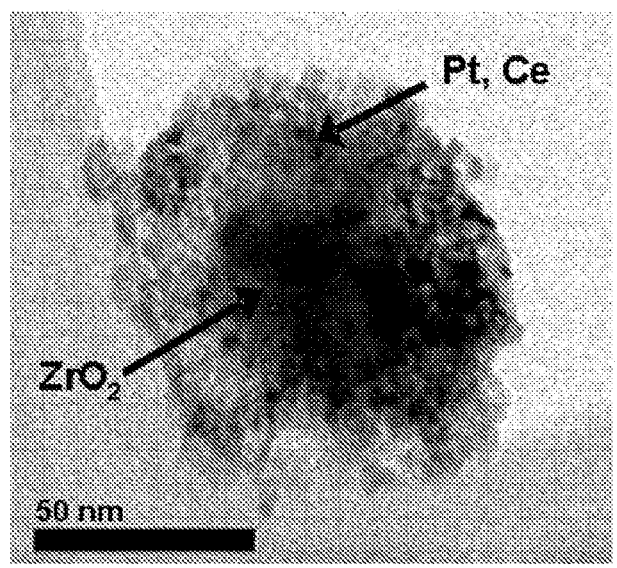
Figure 9:
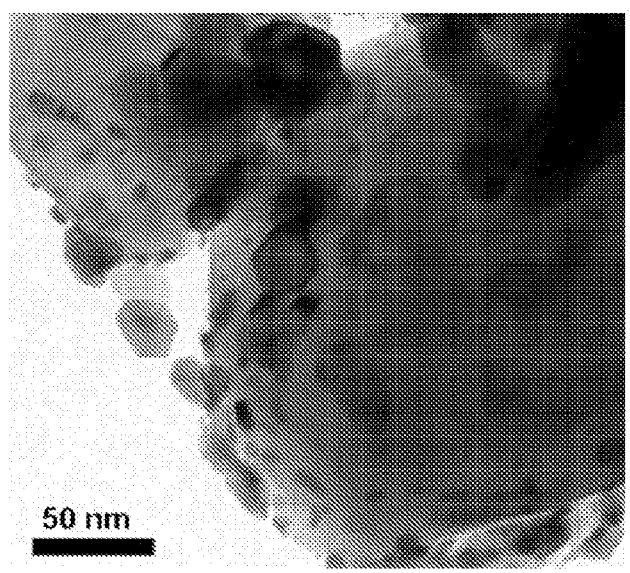

Catalysts were prepared in the same manner as in Example 2, except that the total molar ratio of Ce to $CeO_2$—$ZrO_2$ was varied as in Table 4 below. FIG. 5 is a graph showing CO conversion rate with respect to a mole fraction of Ce in cerium oxide ($CeO_2$)-zirconium oxide ($ZrO_2$) used as a carrier (Ce/(Ce+Zr)), of a catalyst prepared in Evaluation Example 3 at 583K. The carrier $CeO_2$—$ZrO_2$ was prepared using a general co-impregnation method. The amount of Pt was 1 part by weight, and a mixed molar ratio of Ce to Pt was fixed at 10. Herein, the water gas shift reaction was performed by supplying water (steam) into gas containing 10 vol % of carbon monoxide, 10 vol % of carbon dioxide, and 80 vol % of hydrogen, wherein the ratio of water to carbon monoxide was 5:1, and the water was flowed with a GHSV of 90,000 ($hr^{-1}$).

TABLE 4

| Ce/(Ce + Pt) molar ratio carrier: cerium oxide ($CeO_2$)-zirconium oxide ($ZrO_2$) | |
|---|---|
| # 1 | 0 |
| # 2 | 0.05 |
| # 3 | 0.2 |
| # 4 | 0.4 |
| # 5 | 0.6 |
| # 6 | 0.7 |
| # 7 | 0.8 |
| # 8 | 1.0 |

Referring to FIG. 5, the larger the amount of Ce in the carrier, the higher the activity of CO removal. However, when the molar fraction of Ce in $CeO_2$—$ZrO_2$ was 0.3 or more, an increase in the activity of CO removal is insignificant, and particularly, when the molar fraction of Ce in $CeO_2$—$ZrO_2$ was 0.6 or more, the activity was rapidly reduced.

The surface area, pore volume and dispersion degree of each of the metal catalysts prepared in Examples 1 and 2 and Comparative Example 4 and 6 through 8 were measured. For measurement, argon gas containing 10 vol % of hydrogen was added at 30 standard cubic centimeters per minute (sccm), at 300° C. for 1 hour to reduce the carrier catalyst. Then, the degree of dispersion was measured by pulse chemically adsorbing carbon monoxide at 100° C. The surface area was a B.E.T surface area, and measured using a nitrogen isothermal adsorption method. The results are shown in Table 5 below.

TABLE 5

|   | Surface area ($m^2/g$) | Pore volume ($cm^3/g$) | Chemically adsorbed CO amount (CO µmol/g-cat) | Desorbed CO mole/Pt mole | A degree of dispersion (%) |
|---|---|---|---|---|---|
| Example 1 | 23.4 | 0.10 | 38.8 | 0.76 | 76 |
| Example 2 | 99.2 | 0.18 | 44.6 | 0.87 | 87 |
| Comparative Example 4 | 13.3 | 0.04 | 24.3 | 0.47 | 47 |
| Comparative Example 6 | — | — | 21.0 | 0.41 | 41 |
| Comparative Example 7 | — | — | 9.9 | 0.19 | 19 |
| Comparative Example 8 | — | — | 2.0 | 0.04 | 4 |

* A degree of dispersion = (Desorbed CO mole/Pt mole × 100 concentration (%))

As can be seen in Table 5, the dispersion of the catalysts of Examples 1 and 2 was greater than 70%, unlike the catalysts of Comparative Examples 4 through 8.

FIGS. 6 through 9 are transmission electron microscopic (TEM) images of the catalysts prepared in Example 1, Example 2, Comparative Example 4, and Comparative Example 8, respectively.

Referring to FIGS. 6 through 9, in the case of the catalysts of Examples 1 and 2, the platinum, which has a particle diameter of 5 nm or less, is uniformly dispersed in the catalyst. In addition, in the case of the catalysts of Comparative Examples 4 and 8, the platinum is not uniformly dispersed, or Pt particles having a large particle diameter exist. From the results, the Pt dispersion degree of the catalysts of Comparative Examples 4 and 8 is lower than that of the catalysts of Examples 1 and 2.

Figure 10:
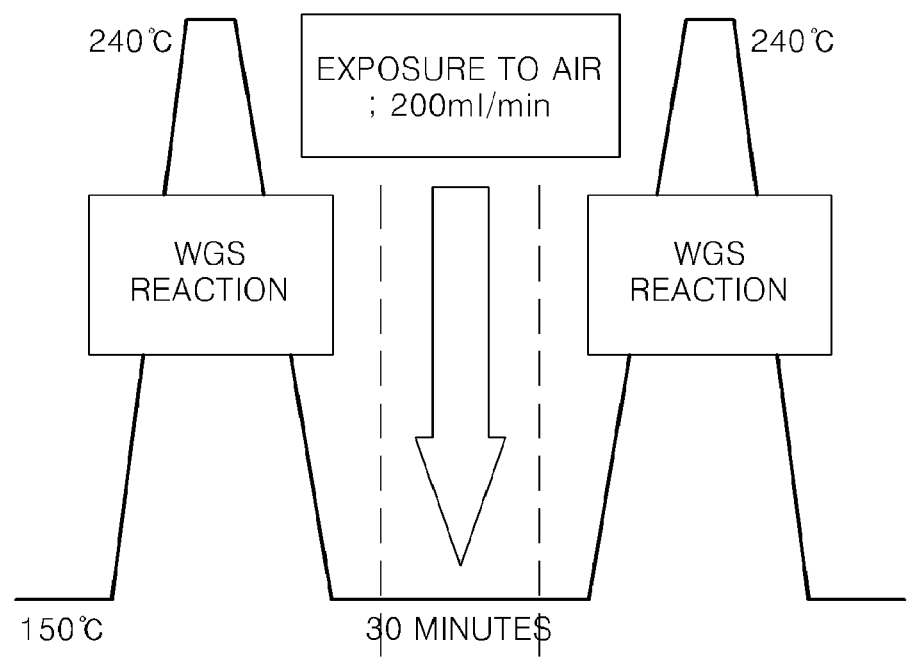
FIG. 10 is a diagram for explaining a method of evaluating non-pyrophoric properties.

Non-pyrophoric properties of the catalysts of Examples 1 and 2 were evaluated. FIG. 10 is a diagram for explaining a method of evaluating pyrophoric properties. Referring to FIG. 10, the evaluation was performed such that after the WGS reaction was performed, air was flowed at 150° C. at 200 ml/min for 30 minutes in order to observe the non-pyrophoric properties of the catalyst when exposed to air, and then the WGS reaction was again performed to evaluate whether the activity properties of the catalyst were changed.

Figure 11:
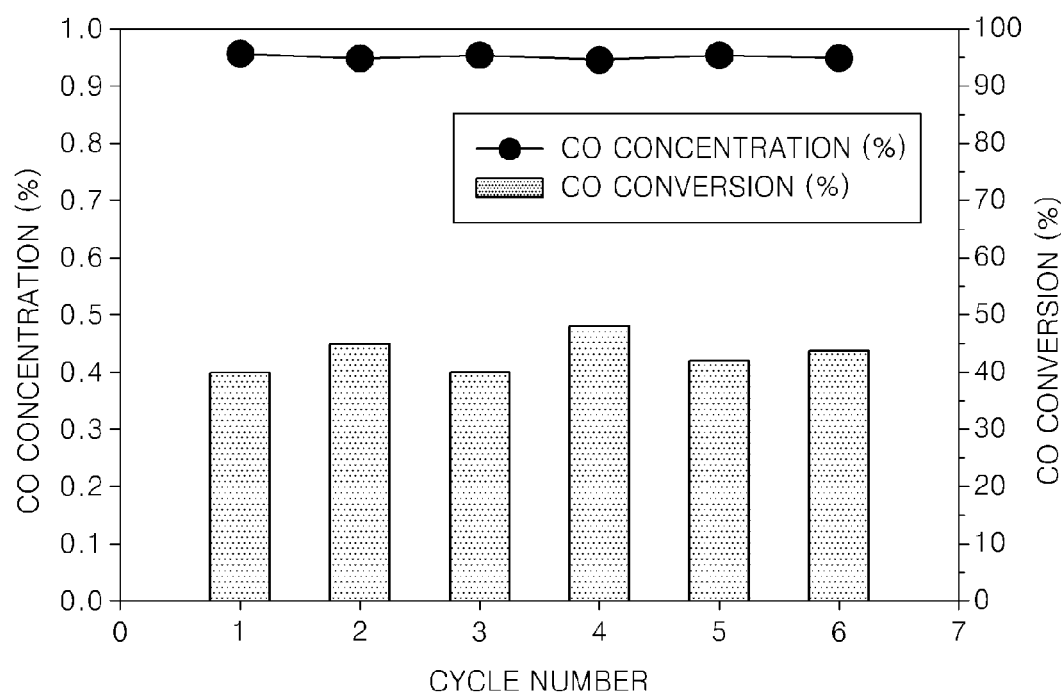
FIG. 11 is a graph showing test results of non-pyrophoric properties of a catalyst prepared in Example 1.
Figure 12:
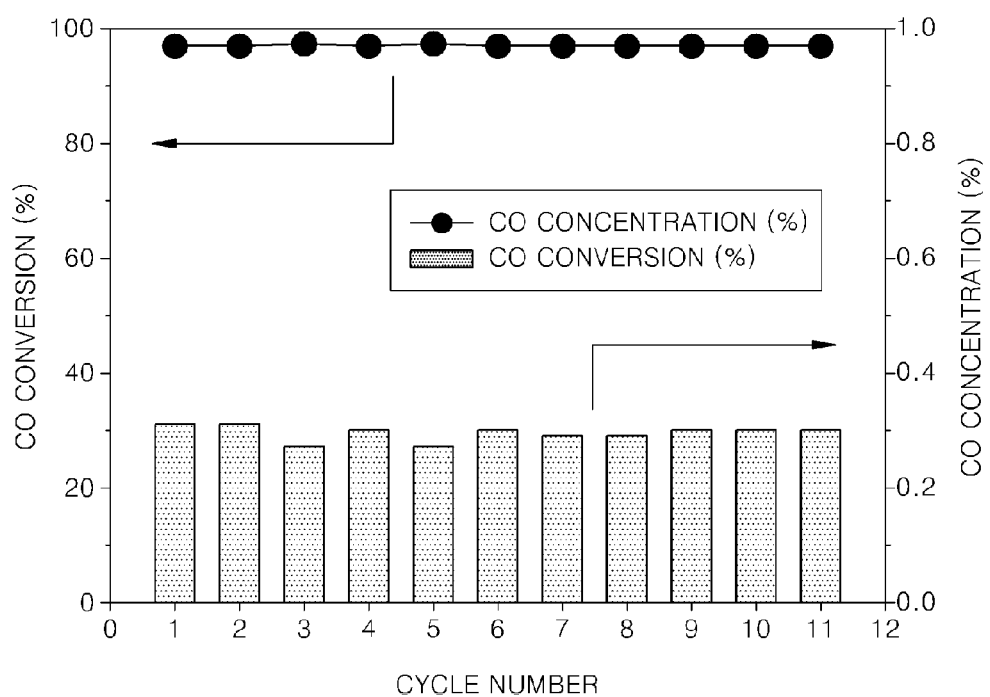
FIG. 12 is a graph showing test results of non-pyrophoric properties of a catalyst prepared in Example 2.

FIG. 11 is a graph showing test results of non-pyrophoric properties of the catalyst prepared in Example 1, and FIG. 12 is a graph showing test results of non-pyrophoric properties of the catalyst prepared in Example 2.

Referring to FIGS. 11 and 12, the catalysts of Examples 1 and 2 maintained stable catalyst performances even after being exposed to air, and thus, the catalysts exhibited non-pyrophoric properties.

EVALUATION EXAMPLE 4

Figure 13:
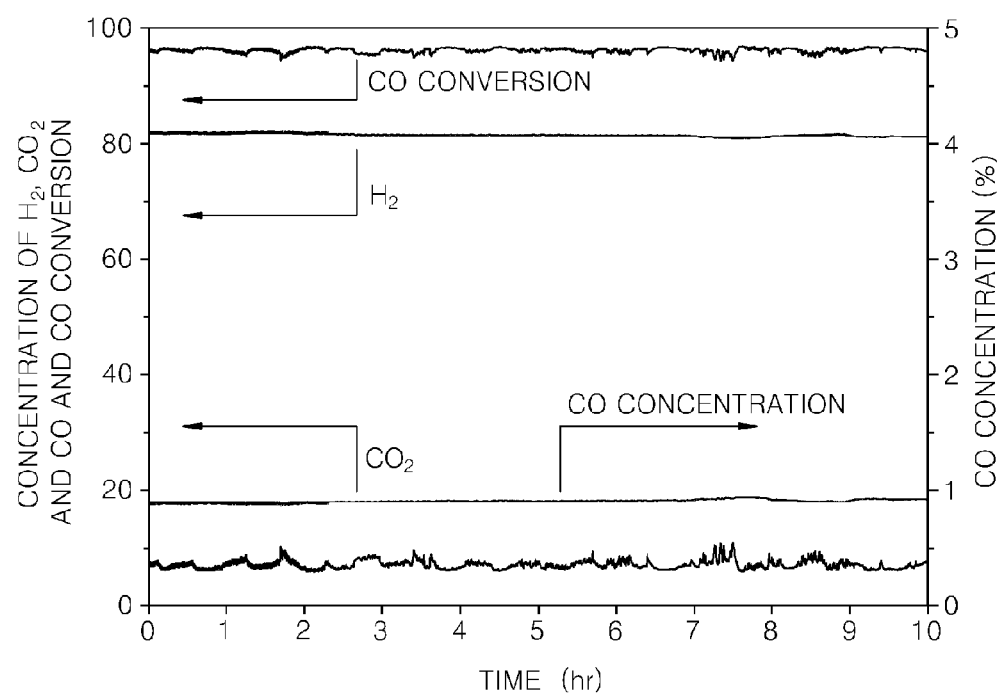
FIG. 13 is a graph showing evaluation results of longevity characteristics of a catalyst prepared in Evaluation Example 4.

A catalyst was prepared in the same manner as in Example 2, except that the amount of Pt was 1 part by weight based on 100 parts by weight of the total weight of the catalyst, and the amount of Ce was 7 parts by weight based on 100 parts by weight of the total weight of the catalyst. FIG. 13 is a graph showing evaluation results of longevity characteristics of the catalyst prepared in Evaluation Example 4. Herein, the WGS reaction was performed by supplying water (steam) into gas containing 10 vol % of carbon monoxide, 10 vol % of carbon dioxide, and 80 vol % of hydrogen, wherein the ratio of water to carbon monoxide was 6:1, and the water was flowed with a GHSV of 6,000 (hr$^{-1}$). The reaction temperature was 240° C.

Referring to FIG. 13, it can be seen that the catalyst maintained stable catalyst activity even after 10 hours.

EVALUATION EXAMPLE 5

Figure 14:
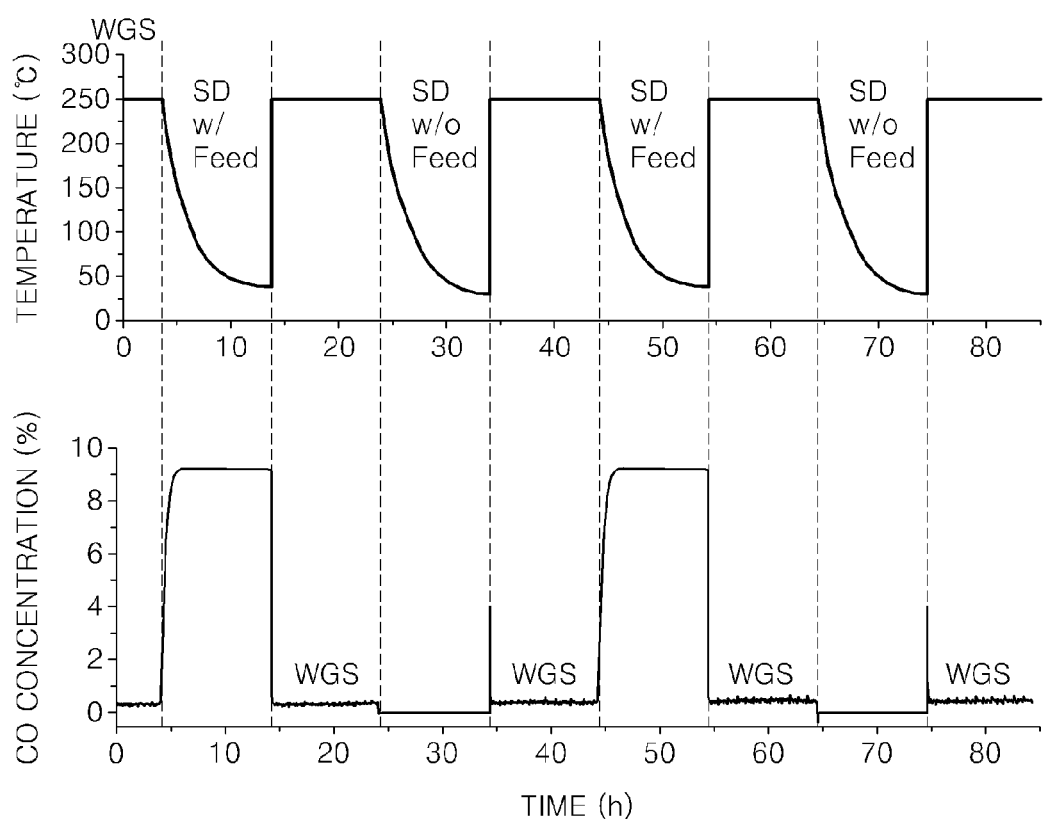
FIG. 14 is a graph showing evaluation results of lifetime characteristics of a catalyst prepared in Evaluation Example 5.

A catalyst was prepared in the same manner as in Example 2, except that the amount of Pt was 1 part by weight based on 100 parts by weight of the total weight of the catalyst, and the amount of Ce was 7 parts by weight based on 100 parts by weight of the total weight of the catalyst. The catalyst activity was evaluated when an apparatus including the catalyst was repeatedly started and stopped. FIG. 14 is a graph showing evaluation results of lifetime characteristics of the catalyst prepared in Evaluation Example 5. The starting-up and stopping were repeated such that the WGS reaction was performed at 250° C., the reaction was stopped with a feed being maintained to reduce the temperature, or the reaction was stopped with the feed being stopped to reduce the temperature, and then the WGS reaction was again performed at 250° C. Herein, the WGS reaction was performed by supplying water into gas containing 10 vol % of carbon monoxide, 10 vol % of carbon dioxide, and 80 vol % of hydrogen, wherein the ratio of water (stream) to carbon monoxide was 6:1, and the water was flowed with a GHSV of 6,000 (hr$^{-1}$). The reaction temperature was 250° C.

Referring to FIG. 14, it can be seen that the catalyst maintained stable catalyst activity even after the frequent starting-up and stopping of the apparatus.

EVALUATION EXAMPLE 6

Figure 15:
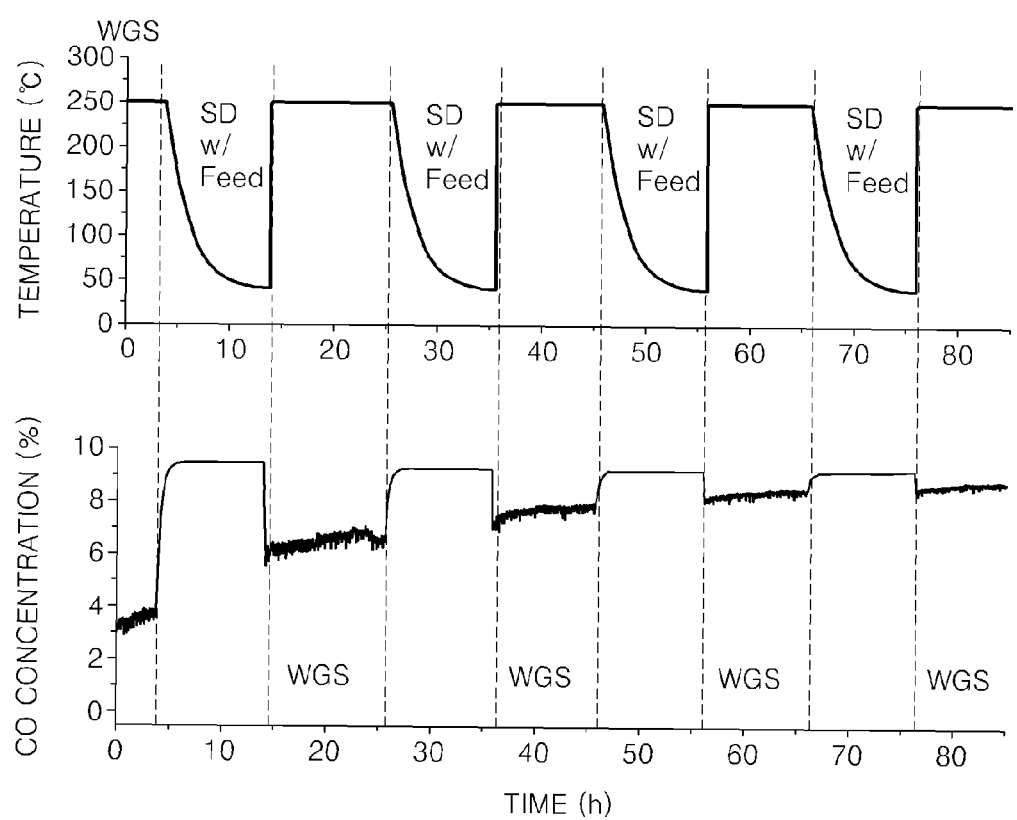
FIGS. 15 and 16 are graphs showing evaluation results of lifetime characteristics of catalysts prepared in Comparative Examples 5 and 6, respectively.
Figure 16:
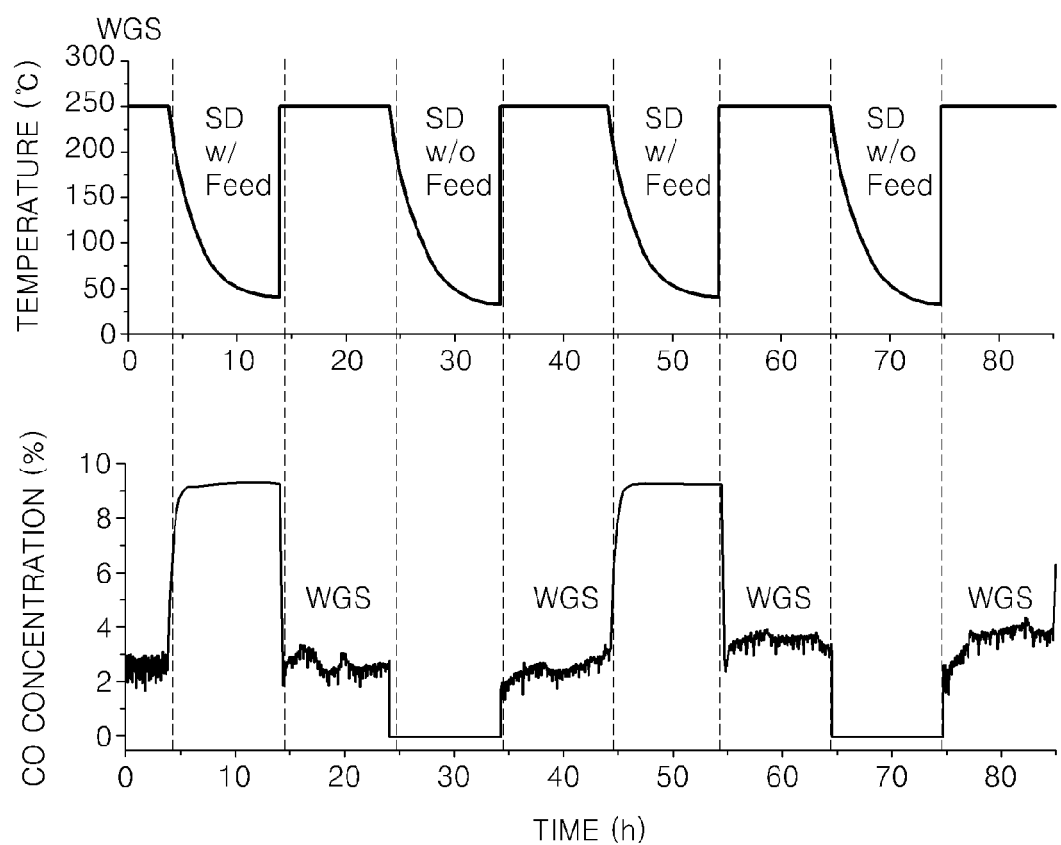

A catalyst was prepared in the same manner as in Evaluation Example 5. Catalyst activity of the catalyst was performed in the same manner as in Evaluation Example 5. FIGS. 15 and 16 are graphs showing evaluation results of lifetime characteristics of the catalysts prepared in Comparative Examples 5 and 6, respectively. As in Evaluation Example 5, the amount of Pt was 1 part by weight based on 100 parts by weight of the total weight of the catalyst, and the amount of Ce was 7 parts by weight based on 100 parts by weight of the total weight of the catalyst. The catalyst activity was evaluated when an apparatus including the catalyst was repeatedly started and stopped. The results are shown in FIGS. 15 and 16.

Referring to FIGS. 15 and 16, it can be seen that the catalysts of Comparative Examples 5 and 6 had gradually reduced catalyst activity according to the frequent starting-up and stopping of the apparatus.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A non-pyrophoric water gas shift reaction catalyst comprising:
an oxide carrier consisting of zirconium oxide ($ZrO_2$) and cerium oxide ($CeO_2$); and platinum (Pt) and cerium (Ce) oxide that are supported on the oxide carrier, wherein the amount of the zirconium oxide ($ZrO_2$) is in a range of 50 to 95 parts by weight based on 100 parts by weight of the oxide carrier, and wherein a molar mixing ratio of the Ce supported on the oxide carrier to Pt supported on the oxide carrier is in a range of 10:1 to 15:1 such that an activity of the non-pyrophoric water gas shift reaction catalyst at a temperature in a range of 230° C. or lower in a reformer of a fuel processor is improved in comparison to the activity of a non-pyrophoric water gas shift reaction catalyst at a temperature in a range of 230° C. in a reformer of a fuel processor in which the molar mixing ratio of Ce to Pt is not in a range of 10:1 to 15:1.

2. The non-pyrophoric water gas shift reaction catalyst of claim 1, wherein the amount of the cerium oxide ($CeO_2$) in the oxide carrier is in a range of 5 to 30 parts by weight based on 100 parts by weight of the total weight of the oxide carrier, and the amount of the zirconium oxide ($ZrO_2$) in the oxide carrier is in a range of 70 to 95 parts by weight based on 100 parts by weight of the total weight of the oxide carrier.

3. The non-pyrophoric water gas shift reaction catalyst of claim 1, wherein the amount of the platinum (Pt) is in a range of 0.5 to 5 parts by weight based on 100 parts by weight of the total weight of the catalyst.

4. The non-pyrophoric water gas shift reaction catalyst of claim 1, wherein the platinum (Pt) has an average particle diameter of 1 to 10 nm.

5. The non-pyrophoric water gas shift reaction catalyst of claim 1, wherein the platinum (Pt) has a degree of dispersion of 70 to 99%.

6. The non-pyrophoric water gas shift reaction catalyst of claim 1, wherein the amount of the zirconium oxide ($ZrO_2$) is in a range of 75 to 95 parts by weight based on 100 parts by weight of the oxide carrier.

7. The non-pyrophoric water gas shift reaction catalyst of claim 1, wherein the amount of the cerium (Ce) is about 10 moles based on 1 mole of the platinum (Pt).

8. The non-pyrophoric water gas shift reaction catalyst of claim 1, wherein the non-pyrophoric water gas shift reaction catalyst has a molar mixing ratio of the Ce to Pt in a range of 10:1.

\* \* \* \* \*

UNITED STATES PATENT AND TRADEMARK OFFICE
CERTIFICATE OF CORRECTION

PATENT NO.        : 8,298,984 B2                                    Page 1 of 1
APPLICATION NO.   : 12/119700
DATED             : October 30, 2012
INVENTOR(S)       : Hyun-Chul Lee et al.

It is certified that error appears in the above-identified patent and that said Letters Patent is hereby corrected as shown below:

Column 14, line 21, change "C." to --C--

Column 14, line 24, change "C." to --C--

Signed and Sealed this
Twenty-fifth Day of December, 2012

David J. Kappos
*Director of the United States Patent and Trademark Office*